United States Patent [19]

Daniele et al.

[11] Patent Number: 4,554,561

[45] Date of Patent: Nov. 19, 1985

[54] MULTI-CHANNEL ELECTRO-OPTIC PRINTER FOR PRINTING PLURAL IMAGE LINES AT ONCE

[75] Inventors: Joseph J. Daniele, Pittsford; Kwok-leung Yip, Webster, both of N.Y.

[73] Assignee: Xerox Corporation, Stamford, Conn.

[21] Appl. No.: 484,038

[22] Filed: Apr. 11, 1983

[51] Int. Cl.[4] ............................................. G01D 9/42
[52] U.S. Cl. ..................................... 346/108; 350/356
[58] Field of Search .................. 346/108, 160, 107 R; 350/356

[56] References Cited

U.S. PATENT DOCUMENTS

| | | | |
|---|---|---|---|
| 3,474,459 | 10/1969 | Silverman | 346/108 |
| 3,829,192 | 8/1974 | Wheeler | 350/7 |
| 4,019,186 | 4/1977 | Dressen et al. | 346/108 |
| 4,253,102 | 2/1981 | Kataoka et al. | 346/108 |
| 4,367,925 | 1/1983 | Sprague | 350/356 |
| 4,370,029 | 1/1983 | Sprague | 350/356 |
| 4,370,030 | 1/1983 | Sprague | 350/356 |
| 4,370,667 | 1/1983 | Ohara et al. | 346/108 |
| 4,370,678 | 1/1983 | Kitamura | 358/285 |
| 4,380,373 | 4/1983 | Sprague | 350/356 |
| 4,386,827 | 6/1983 | Scifres | 350/356 |
| 4,391,490 | 7/1983 | Hartke | 350/356 |
| 4,396,252 | 8/1983 | Turner | 350/356 |
| 4,415,915 | 11/1983 | Sprague | 350/356 |
| 4,420,760 | 12/1983 | Phillips | 346/108 |
| 4,437,106 | 3/1984 | Sprague | 350/356 |

*Primary Examiner*—E. A. Goldberg
*Assistant Examiner*—M. Reinhart
*Attorney, Agent, or Firm*—Frederick E. McMullen

[57] ABSTRACT

An electro-optic printer of the type having a laser, a modulator for modulating the laser beam in accordance with image signals; an optical system including a rotating polygon for sweeping the modulated beam across the photosensitive drum of a xerographic system to expose the drum and create images thereon, the modulator having a plurality of separately controlled electrode groups effective to modulate portions of the laser beam in accordance with individual lines of image signals to enable multiple image lines to be exposed at once on the photosensitive drum; and a step drive to synchronously step the photosensitive drum in increments equal to the combined width of the lines being processed.

In a first alternate embodiment, the modulator is based on a wave guide, and in a second alternate embodiment, the modulator is composed of a series of flexible reflective fingers.

10 Claims, 7 Drawing Figures

MULTI-CHANNEL ELECTRO-OPTIC PRINTER FOR PRINTING PLURAL IMAGE LINES AT ONCE

This application relates to very high speed electro-optic printers and scanners, and more particularly, to an improved modulator for such printers and scanners.

Electro-optic printers and scanners typically include a source of high intensity light, normally a laser, a modulator for modulating the beam of light emitted by the laser in accordance with image signals representing the image to be printed, an optical system for focusing and raster scanning the modulated beam of light across a recording member, and an image processing system for processing the image created on the recording member to provide an image copy.

Typically, the recording member is a photosensitive drum or web operatively integrated with a xerographic type image processing system. In a xerographic system, the photosensitive recording member is charged to a uniform level prior to being exposed by the modulated beam of light, the latter creating a latent electrostatic image on the recording member as the beam sweeps thereacross. The latent image so created is thereafter developed, transferred to a suitable copy material, normally paper, fused to provide a permanent copy, and discharged.

The aforementioned optical system normally includes a scanning element such as a polygon having a plurality of mirror-like reflecting surfaces or facets about the periphery thereof and against which the beam is impinged. The mirrored surfaces of the polygon reflect the beam to the recording member, rotation of the polygon causing the beam to sweep across the recording member in what is commonly referred to as the x scan direction. Movement of the recording member effects the requisite movement along the other or y scan direction.

The modulator, which may for example comprise an acousto-optic type modulator, operates to selectively deflect or bend the beam of high intensity light from the laser to provide at least a zeroth order beam and a first order beam. One beam, i.e. the zeroth order beam, is focused onto a beam stop and blocked. The other beam, i.e. the first order beam, is swept by the polygon across the recording member where selective exposure takes place as described above.

Present day modulators such as the aforementioned acousto-optic modulator have inherent operating limitations which prevent their use in very high speed, high resolution applications. In this context, it is understood that both the operating speed of the system as well as the number of spots to be imaged per increment of distance are significant factors in the ability of the modulator to perform. A modulator may be able to handle a relatively high speed application if the resolution is low since overall, the number of images per increment of time is within the modulator performance. Similarly, the same performance may be possible in a low speed system with relatively high resolution. But where very high speeds and very high resolution are desired, current modulators are not adequate.

The invention seeks to overcome the forgoing by providing a electro-optic printer combining high speed and high resolution, the printer including means for generating a beam of high intensity light and a recording member for recording images thereon, the improvement comprising: modulator means for modulating the beam of light into a plurality of exposure beams for exposing multiple image lines at once on the recording member in response to separate lines of image signals, the modulator means including a modulating section for each of the exposure beams having at least one light valve; control means for independently operating the light valves of each modulating section in response to individual image signal lines to simultaneously provide plural modulated exposure beams; and means to scan the plural modulated exposure beams across the recording member at once whereby to simultaneously write plural image lines on the recording member.

IN THE DRAWINGS

Figure 1:
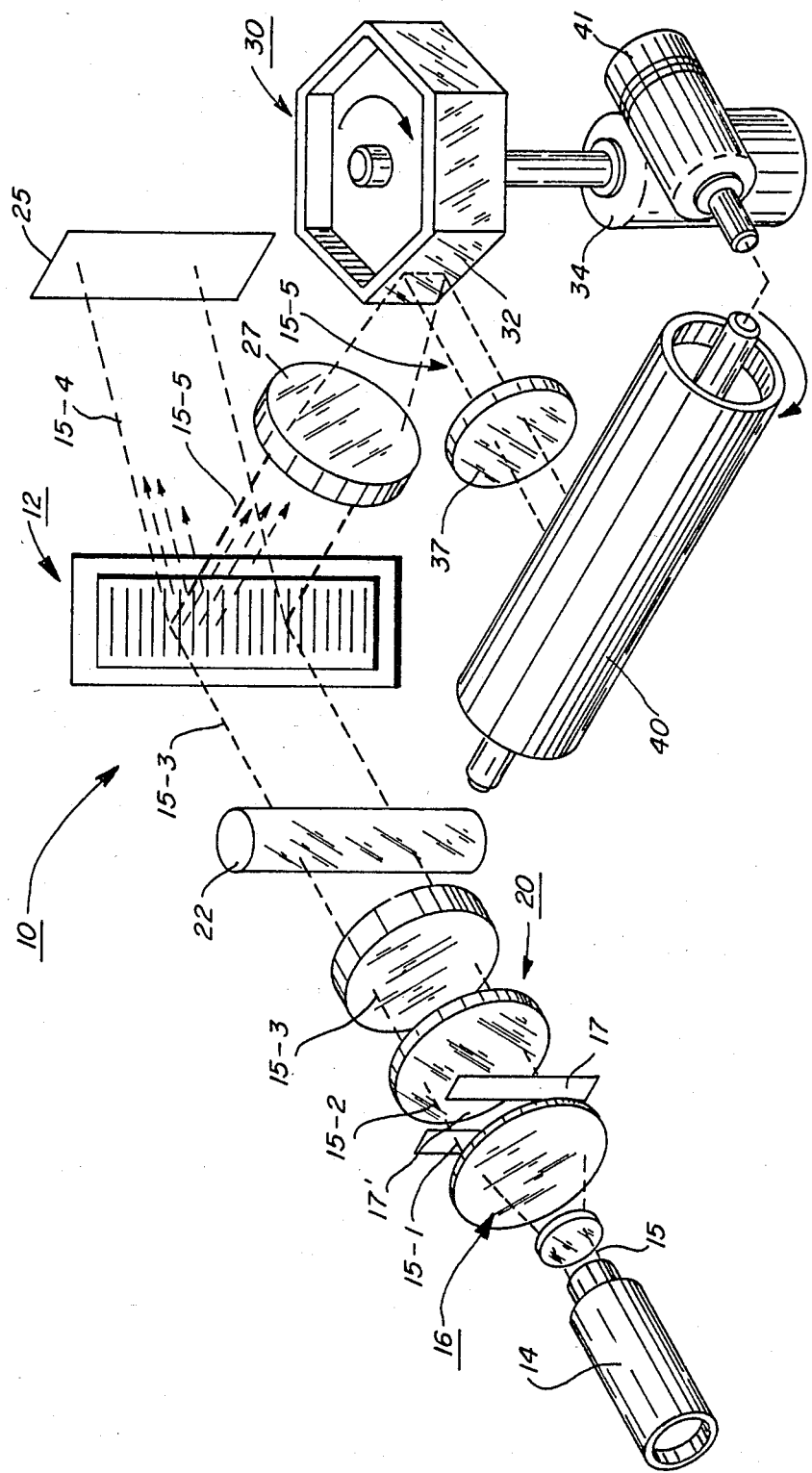
FIG. 1 is an isometric view showing an electro-optic printer incorporating the improved multi-channel modulator of the present invention.
Figure 2:
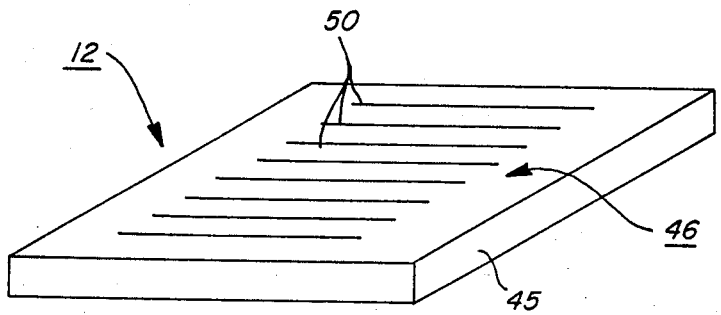
FIG. 2 is an enlarged isometric view showing details of the multi-channel modulator shown in FIG. 1.
Figure 3:
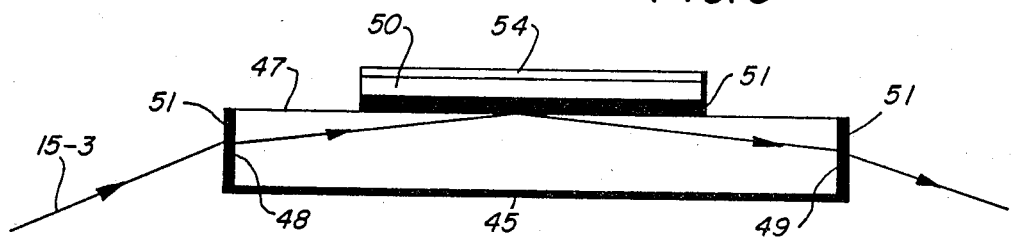
FIG. 3 is a cross sectional view of the modulator shown in FIG. 2.
Figure 4:
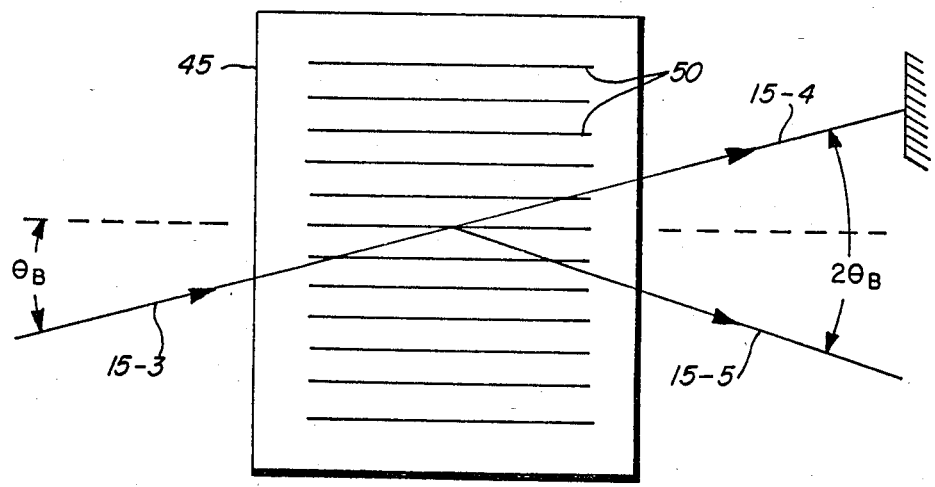
FIG. 4 is a top plan view of the modulator shown in FIG. 2.

Referring to FIG. 1 of the drawings, an electro-optic printer 10 embodying the multi-channel modulator of the present invention, designated generally by the numeral 12, is there shown. As will appear, modulator 12 permits multiple lines of image data or pixels to be modulated simultaneously thereby enabling extremely high printer operating speeds.

In the printer 10, preferably a polarized laser 14 serves as the source of high intensity radiation, the beam of light 15 output by laser 14 being expanded by a two lens beam expander 16. The expanded beam of light 15-1 passes through a line-like aperture or slit 17' of apertured plate 17. The sheet like beam of light 15-2 from plate 17 passes to aspheric lens system 20. There, the collimated non-uniform sheet of light 15-2 is transformed into a collimated beam 15-3 of uniform intensity and predetermined width W without loss of energy, it being understood that the beam width W is dependent upon the number of modulating channels n in modulator 12 which in turn is dependent upon the number of image lines to be modulated. While the number of image lines and hence the number of modulating channels n in modulator 12 may vary, one may envision modulator 12 as having 32 modulating channels and accordingly, in that event, the width W of beam 15-3 would be sufficient to enable processing of up 32 lines of image data at once.

The sheet like collimated beam of light 15-3 from aspheric lens system 20 passes through a cylindrical lens 22, striking modulator 12 at a predetermined angle. The incident light is linearly polarized along the optic axis of the modulator crystal. As will appear more fully herein, modulator 12 in effect breaks the beam of light 15-3 into n individual beams for processing purposes, the individual beams each being modulated individually to provide either zeroth order beams 15-4 or first order beams 15-5 in response to the image signal inputs to modulator 12.

The zeroth order beam or beams 15-4 (it is understood that there may be up to n zeroth order beams at once), in the exemplary arrangement shown, impinges against a suitable stop 25 while the first order beam or beams 15-5 (it is understood that there may be up to n first order beams at once) passes to first imaging lens 27 which focuses each beam at a point on the mirror-like surfaces of polygon 30. As will be understood, the loci of the points of focus of the first order beams 15-5 comprises a line.

Polygon 30 has a plurality of mirrored surfaces or facets 32 about the circumference thereof for scanning the first order beam or beams 15-5 impinging against it through a predetermined arc. Polygon 30 is supported for rotation by suitable bearings (not shown), motor 34 serving to rotate polygon 30 in the direction shown by the solid line arrow. The first order beam or beams 15-5 impinging on the mirrored surfaces of polygon 30 are reflected to imaging lens 37 and the printer recording medium 40. While a polygon type scanning element is pictured and described herein, other types of scanning elements such as a holographic disc, galavanometer mirror, etc. may instead be envisioned.

Recording medium 40 is depicted as being a photoconductively coated xerographic drum which is rotated, i.e. stepped, by step motor 41 in the direction of the arrow. It will nevertheless be evident that there are other xerographic and non-xerographic recording media that could be used for this purpose, including photoconductively coated xerographic belts and plates as well as photosensitive film and coated paper which may be supplied as web or cut sheet stock. The recording media should therefore be visualized in the generalized case as being a photosensitive medium which is exposed in an image configuration while advancing in a cross line or line pitch direction relative to the modulator 12.

Referring now to FIGS. 2-5, modulator 12 comprises a generally rectangular base or crystal 45 of suitable electro-optic material such as lithium tantalate ($LiTaO_3$) having multiple electrode sets 46-1, 46-2, ... 46-n (seen in FIG. 5) evaporated thereon. As will appear, electrode sets 46-1, 46-2, ... 46-n interact with the light beam 15-3 in a total internal reflection (TIR) configuration upon application of a preset potential thereacross. Each electrode set 46-1, 46-2, ... 46-n corresponds to one image line and accordingly in the exemplary arrangement, n equals 32.

Crystal 45 has three polished surfaces composed of reflective surface 47 and optical window surfaces 48, 49. Surfaces 47, 48, 49 are coated with a suitable anti-reflective coating 51 such as magnesium floride ($MgF_2$), the surfaces 47, 48, 49 being arranged so tht the collimated beam of light 15-3 incident at an angle to the plane of reflective surface 47 is refracted at the window surfaces 48, 49 to thereby incur total internal reflection at the surface 47. It will be appreciated that crystal shapes other than that shown may be used to achieve total internal reflection.

Each electrode set 46-1, 46-2, ... 46-n is composed of plural pairs of electrodes 50, each electrode pair cooperating to form in effect a light valve. Electrodes 50, which may for example be aluminum, are deposited on the surface 47 of crystal 45, the axis of the electrodes 50 being at the Bragg angle $\theta_B$ relative to the axis of the incident light beam 15-3. The outer surface of electrodes 50 is provided with a suitable reflective coating 54 which may for example be chromium (Cr).

Figure 5:
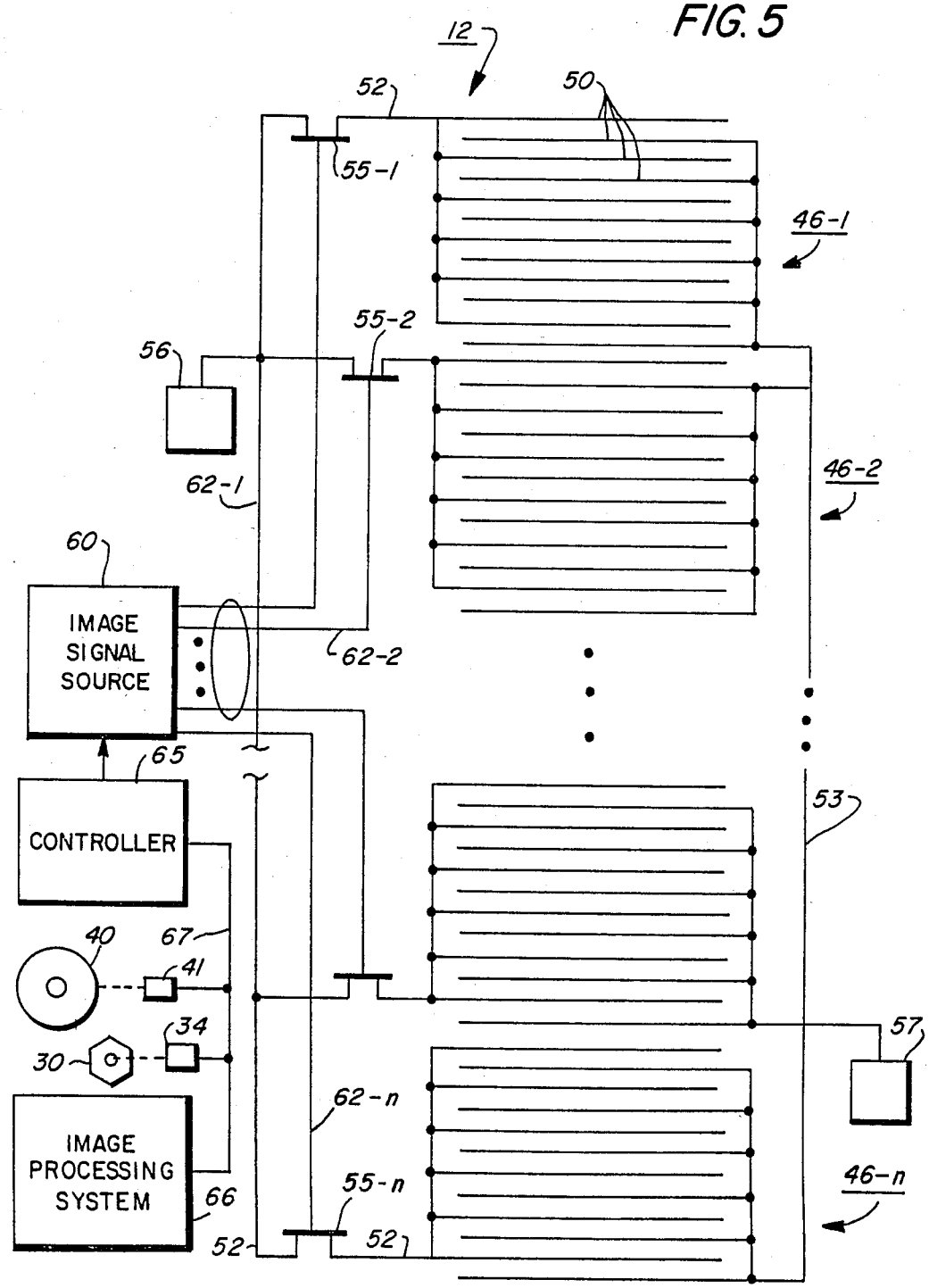
FIG. 5 is a partial circuit schematic showing the operating circuit for the printer of FIG. 1 and details of the operating circuit for the multi-channel modulator of the present invention.

As best seen in FIG. 5, the electrodes 50 of each electrode set 46-1, 46-2, ... 46-n are arranged in an interdigited pattern with one another, every other electrode 50 in each electrode set being coupled to a common line 52, 53. Line 52 of each electrode set 46-1, 46-2, ... 46-n is coupled through control gates 55-1, 55-2, ... 55-n to a first potential source 56 while line 53, which may be common for all electrode sets 46-1, 46-2, ... 46-n is coupled to a second potential source 57.

A suitable source 60 of image signals or pixels, which may for example comprise a memory, or input scanner, communication line, etc. is provided. Image signal source 60 has a multi-bit output 62-1, 62-2 ... 62-n, each output being coupled to the control terminal of the corresponding control gate 55-1, 55-2, 55-n such that the multi-line binary image signal output of image signal source 60 selectively actuates the control gate associated therewith in accordance with the image signal content. A suitable controller 65 is provided for addressing the image data in image signal source 60 in blocks of n lines at a time. Controller 65 additionally controls via control line 67 operation of step motor 41, polygon motor 34, and the attendant operating components of the image processing system (identified generally by the numeral 66 in FIG. 5). As will be understood by those familiar with the xerographic arts, such image processing system components would normally include a charging device to place an electrostatic charge on recording member 40, a developer mechanism for developing the image on recording member 40, copy sheet supply tray or trays with attendant copy sheet feeder for supplying copy sheets to the image transfer point whereat the developed image is transferred from recording medium 40 to the copy sheet, fusing mechanism for fixing the image on the copy sheet, and the like. Step motor 41, when actuated, advances the recording medium 40 in steps synchronized with the output of image signals by image signal source 60.

In one example, modulator crystal 45 is Y-cut $LiTaO_3$ having a length L=7 mm, a width W=3 mm and a height H=1.5 mm. The width of electrodes 50=4 $\mu m$, spacing between electrodes=4 $\mu m$, electrode length=3.5 $\mu m$, electrode pitch=16 $\mu m$, number of pitches/channel=5, electrode width/channel=80 $\mu m$, number of channels=32, and total electrode width=2.56 mm. Laser 14 is a HeNe laser with an angle of incidence (in air)=1.14°, angle of diffraction (in air)=2.28°, value of Q-parameter=24.93, and drive voltage=20.5 volts.

In operation, signals from controller 65 initiate operation of the image signal source 60, stepping of imaging member 40, rotation of polygon 30, and image processing system 66. Image signals are accordingly output by image signal source 60, it being understood that multiple lines n of image signals are output simultaneously and in synchronism with one another through output lines 62-1, 62-2, ... 62-n to the control gates 55-1, 55-2, ... 55-n of electrode sets 46-1, 46-2, ... 46-n. Step motor 41 steps imaging member 40 once for each n image lines, the distance imaging member 40 is stepped being equal to the total width of the block of image lines n.

Control gates 55-1, 55-2, ... 55-n, when triggered, couple the electrodes 50 of the electrode set 46-1, 46-2, ... 46-n associated therewith across potential sources 56, 57. The establishment of a potential difference between adjoining electrodes of the electrode set being actuated causes the portion of the incident beam 15-3 striking the electrode set to deflect and form the first order beam 15-5. As described, the first order beam or beams 15-5 pass via imaging lenses 27, 37 and polygon 30 to imaging member 40 to expose the portion of the member 40 struck by the beam. Where a control gate 55-1, 55-2, . . . 55-n is not triggered, the electrode set 46-1, 46-2, . . . 46-n associated therewith remains inactive and the portion of the incident beam 15-3 striking the electrode set is not deflected and continues on as zeroth order beam 15-4. Accordingly, the corresponding portion of imaging member 40 is not exposed.

The selective exposure of imaging member 40 cretes a latent electrostatic image on member 40 which is thereafter developed, transferred to a copy sheet, and fixed or fused to provide a permanent copy as described.

Figure 6:
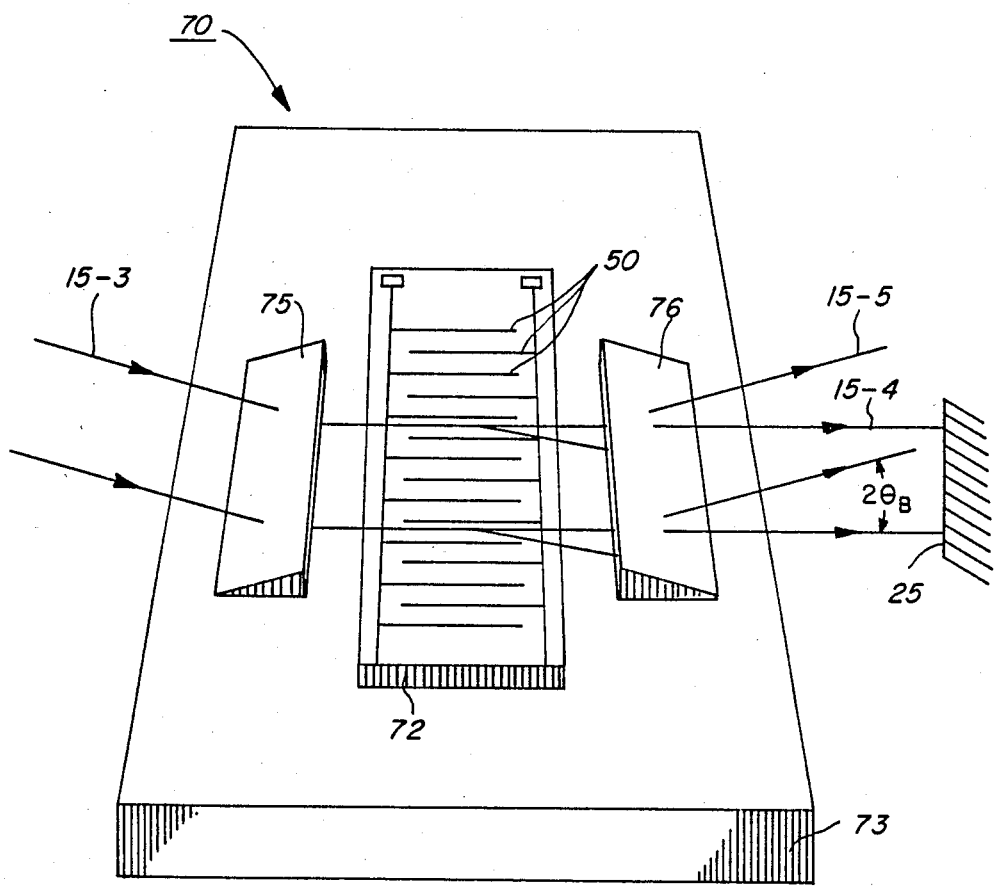
FIG. 6 is an enlarged isometric view of an alternate modulator construction.

In the embodiment shown in FIG. 6, where like numbers refer to like parts, modulator 70 comprises an electro-optic waveguide modulator. In this embodiment, the sets 46-1, 46-2, . . . 46-n of electrodes 50 together with the operating circuitry therefor are fabricated on a relatively thin buffer layer 72 on the surface of a planar electro-optic waveguide 73. Input prism 75 couples the incident light beam 15-3 to the waveguide and electrode sets 46-1, 46-2, . . . 46-n while output prism 76 passes the zeroth and first order beams 15-4, and 15-5 to beam stop 25 and imaging member 40 respectively, the latter via imaging lenses 27, 37 and polygon 30 as described above.

In operation, when voltage is applied between the interdigital electrodes 50 of electrode sets 46-1, 46-2, . . . 46-n, the incident light 15-3 is diffracted at an angle $2\theta_B$ ($\theta_B$ is the Bragg angle) from the zeroth order beam 15-4 to provide the first order beam 15-5.

A Schlieren central dark field imaging optic system may be used instead of the diffraction system shown in FIG. 1 between modulator 12 and recording medium 40. That system, as will be understood by those skilled in the art, provides a field lens for focusing the zeroth order beam or beams 15-4 onto a central stop at the fourier transform plane and cooperating imaging lenses and polygon for imaging the first order beam or beams 15-5 onto the recording medium 40.

Figure 7:
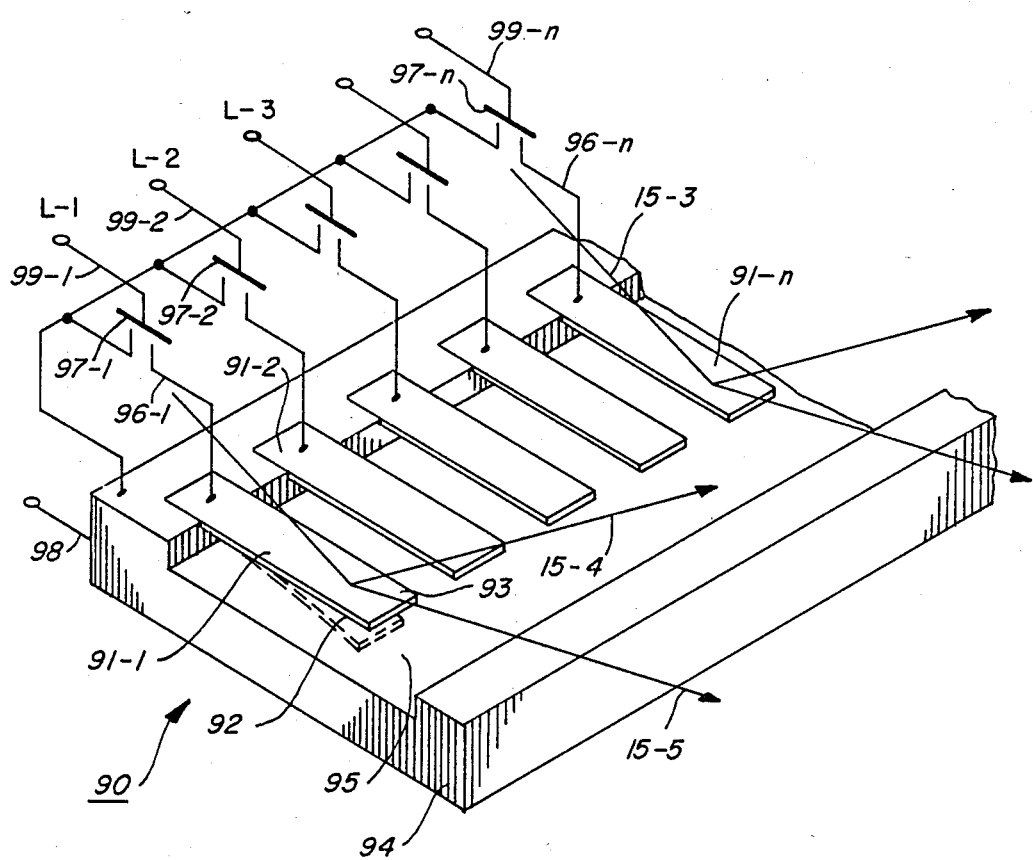
FIG. 7 is an enlarged isometric view of a second alternate modulator construction.

In the embodiment shown in FIG. 7, where like numbers refer to like parts, the light valves comprise a succession of flexible fingers 91-1, 91-2, . . . 91-n, the number of fingers 91-1, 91-2, . . . 91-n being equal to the number of image lines L-1, L-2, . . . L-n to be processed simultaneously. Fingers 91-1, 91-2, . . . 91-n each comprises a silicon wafer 92 with metallic mirror-like coating 93 thereon supported in cantilever fashion on a generally rectangular base 94. Base 94 is recessed at 95, the free end of the fingers 91-1, 91-2, . . . 91-n projecting thereover. Base 94, which may also be fabricated from silicon, preferably has the modulator operating circuit integrated therewith, such operating circuit including individual energizing leads 96-1, 96-2, . . . 96-n with control switches 97-1, 97-2, . . . 97-n for each finger and a common lead 98. Leads 96-1, 96-2, . . . 96-n and 98 are coupled to a suitable source of potential (not shown) while the controlling gate of switches 97-1, 97-2, . . . 97-n are coupled by lines 99-1, 99-2, . . . 99-n to the image signal line outputs of the image signal source which may for example comprise the image signal source 60 shown in FIG. 5.

The incident light beam 15-3 is directed against the row of fingers 91-1, 91-2, . . . 91-n of modulator 90 at a predetermined angle of incidence, the mirror surfaces 93 of fingers 91-1, 91-2, . . . 91-n reflecting the beam 15-3 as a succession of zeroth order or first order beams 15-4 and 15-5 respectively depending upon the image signal content. Where control switches 97-1, 97-2, . . . 97-n are triggered by the image signal input, the finger associated therewith is coupled across the source of potential. The application of an electrical potential causes the finger to deflect or bend as shown by the dotted lines of FIG. 7 and the portion of the incident beam 15-3 striking the finger is therefore reflected as first order beam 15-5. As described, the first order beam or beams 15-5 pass via imaging lenses 27, 37 and polygon 30 to imaging member 40. Where a control switch 97-1, 97-2, . . . 97-n is not triggered, the finger associated therewith remains deflected and the portion of the incident beam 15-3 striking the finger is reflected as zeroth order beam 15-4 against stop 25.

While the invention has been described with reference to the structure disclosed, it is not confined to the details set forth but is intended to cover such modifications or changes as may come within the scope of the following claims.

We claim:

1. In an electro-optic printer combining high speed and high resolution including means for generating a beam of high intensity light and a recording member for recording images thereon, the improvement comprising:

(a) modulator means;

(b) optical means for transforming said beam into a relatively wide sheet of light impinging across said modulator means;

said modulator means modulating said sheet of light into a plurality of parallel beams for exposing multiple image lines at once on said recording member in response to a number of plural individual image signal inputs, each of said image signal inputs representing a separate image line, said modulator means having plural light valves arranged in a row and forming a plurality of discrete modulating sections, there being at least one light valve in each modulating section;

the width of said sheet of light being sufficient to impinge across all of said row of light valves at once, the plane of said sheet of light being substantially parallel to the longitudinal axis of aid row of light valves;

(c) control means for operating the light valves of each modulating section individually in response to the image signal input associated with the modulating section to output a plurality of parallel exposure beams equal in number to said modulating sections; and (d) means to simultaneously scan said plural exposure beams across said recording member and thereby write plural image lines on said recording member at once.

2. The printer according to claim 1 in which each of said light valves comprises an independent flexible light reflecting finger, there being at least one finger for each of said beams.

3. The printer according to claim 1 in which each of said light valves comprises an electrode pair, there being at least one electrode pair for each of said modulating sections.

4. The printer according to claim 3 in which said control means includes switch means for each of said electrode pairs, said switch means when actuated coupling the electrode pair associated therewith across a potential whereby the portion of said light beam striking said electrode pair is difracted to a new path, and means for controlling actuation of each of said switch means individually in response to said image signal inputs.

5. The printer according to claim 4 in which said electrode pairs each comprises a plurality of electrodes arranged in interdigitated relation to one another.

6. The printer according to claim 4 in which said modulator means includes an electro-optical material, said electrodes being integrated with said electro-optical material.

7. The printer according to claim 4 in which said modulator means includes waveguide means, said electrodes being integral with said waveguide means.

8. In a high speed, high resolution scanner, the combination of:
 (a) a light source;
 (b) optical means for forming the light from said light source into a substantially planar sheet-like beam of light;
 (c) modulator means operatively disposed in the path of said sheet-like beams of light for independently modulating discrete portions of said beam in response to separate lines of image signals whereby to provide plural parallel imaging beams for writing a plurality of image lines at once; said modulator means including,
 an electro-optical material;
 a linear electrode pattern array formed on a predetermined surface of said material arranged in a row, said electrode pattern array comprising a plurality of sets of electrodes, there being one electrode set for each of said image lines, each of said electrode sets having at least one pair of electrodes, one of said pair of electrodes in said electrode sets being addressable by the line of image signals associated therewith to selectively apply voltage levels thereto; the other electrode of said electrode pair being connected to a common voltage level whereby the selective application of voltage levels to said electrode pairs in accordance with said line of image signals induces an electric field in the electrode set adjacent said predetermined surface to diffract the portion of said light beam incident on said material whereby said light beam portion exposes said recording medium;
 the plane of said sheet-like beam of light being substantially parallel with the longitudinal axis of said electrode pattern row;
 (d) a movable recording medium on which images are formed by selective exposure by light;
 (e) means for sweeping said imaging beams across said recording medium to expose said medium to simultaneously form a plurality of image lines thereon in accordance with said image signals; and
 (f) means for stepping said recording medium in synchronism with each sweep of said imaging beams through a distance substantially equal to the combined image width of said plurality of image lines.

9. The scanner according to claim 8 in which said sets of electrodes each comprise a preset number of electrode pairs arranged in interdigitated relation with one another, the axes of said electrodes being substantially parallel with the axis of said light beam.

10. The scanner according to claim 9 in which said material comprises a wave guide having light inlet and discharge surfaces, and prism means for passing said light beam into and out of said inlet and discharge surfaces.

* * * * *